US012747346B2

(12) United States Patent
Shingai

(10) Patent No.: US 12,747,346 B2
(45) Date of Patent: Sep. 29, 2026

(54) LIQUID FABRICATION AND METHOD OF MANUFACTURING FABRICATION OBJECT

(71) Applicant: Yuki Shingai, Kanagawa (JP)

(72) Inventor: Yuki Shingai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 349 days.

(21) Appl. No.: 18/350,636

(22) Filed: Jul. 11, 2023

(65) Prior Publication Data

US 2024/0018351 A1 Jan. 18, 2024

(30) Foreign Application Priority Data

Jul. 14, 2022 (JP) ................................ 2022-113504

(51) Int. Cl.

| | |
|---|---|
| ***C08L 31/04*** | (2006.01) |
| ***B22F 10/14*** | (2021.01) |
| ***B29C 64/165*** | (2017.01) |
| ***B33Y 10/00*** | (2015.01) |
| ***B33Y 70/00*** | (2020.01) |

(52) U.S. Cl.

CPC ............... *C08L 31/04* (2013.01); *B33Y 70/00* (2014.12); *B22F 10/14* (2021.01); *B29C 64/165* (2017.08); *B33Y 10/00* (2014.12)

(58) Field of Classification Search

CPC .. C08L 31/04; C08L 29/02; C08L 5/06; C08L 45/00; C08L 29/08; B33Y 70/00; B33Y 10/00; B22F 10/14; B22F 1/103; B22F 3/1021; B29C 64/165; C08K 5/05; C08K 5/06; C09D 11/10; C09D 11/106; C09D 11/36; C22C 1/0408; C22C 1/0416; C22C 1/0483

See application file for complete search history.

(56) References Cited

U.S. PATENT DOCUMENTS

| | | | |
|---|---|---|---|
| 11,161,995 | B2 | 11/2021 | Gouzman et al. |
| 2016/0040025 | A1 | 2/2016 | Norikane et al. |
| 2016/0160021 | A1 | 6/2016 | Kojima et al. |
| 2016/0177122 | A1 | 6/2016 | Naruse et al. |
| 2016/0236412 | A1 | 8/2016 | Kusahara et al. |
| 2016/0271877 | A1 | 9/2016 | Suzuki et al. |
| 2016/0271879 | A1 | 9/2016 | Yamashita et al. |
| 2016/0272844 | A1 | 9/2016 | Osaka et al. |
| 2016/0368212 | A1 | 12/2016 | Matsubara |

(Continued)

FOREIGN PATENT DOCUMENTS

| | | |
|---|---|---|
| JP | 3607300 | 1/2005 |
| JP | 2020-015848 | 1/2020 |

(Continued)

OTHER PUBLICATIONS

European Search Report received for European Patent Application No. 23184614.8, mailed on Nov. 24, 2023, 10 pages.

(Continued)

*Primary Examiner* — Rebecca Janssen

(74) *Attorney, Agent, or Firm* — Grüneberg Global IP, PLLC

(57) ABSTRACT

A liquid fabrication contains an oligomer with a ring structure having a number average molecular weight of 3,000 or less and an organic solvent, wherein the liquid fabrication is substantially free of water and is applied to a layer of powder containing metal particles.

15 Claims, 2 Drawing Sheets

(56) References Cited

U.S. PATENT DOCUMENTS

| | | | |
|---|---|---|---|
| 2017/0121542 A1 | 5/2017 | Xu et al. | |
| 2017/0266880 A1 | 9/2017 | Matsubara | |
| 2017/0305142 A1 | 10/2017 | Yamaguchi | |
| 2018/0305266 A1 | 10/2018 | Gibson et al. | |
| 2018/0326491 A1 | 11/2018 | Koike et al. | |
| 2019/0388966 A1 | 12/2019 | Gibson et al. | |
| 2020/0031041 A1 | 1/2020 | Goredema et al. | |
| 2020/0223133 A1 | 7/2020 | Matsubara | |
| 2020/0290124 A1 | 9/2020 | Oya | |
| 2020/0290270 A1 | 9/2020 | Saitoh et al. | |
| 2021/0001543 A1 | 1/2021 | Sogame et al. | |
| 2021/0292511 A1 | 9/2021 | Satoh | |
| 2022/0112329 A1 | 4/2022 | Satoh et al. | |
| 2022/0155755 A1 | 5/2022 | Nakazawa | |
| 2022/0282080 A1 | 9/2022 | Shingai et al. | |
| 2022/0305557 A1 | 9/2022 | Satoh et al. | |
| 2022/0363008 A1 | 11/2022 | Hayakawa et al. | |
| 2022/0388066 A1 | 12/2022 | Nishi et al. | |
| 2022/0388069 A1 | 12/2022 | Kai et al. | |
| 2022/0402040 A1 | 12/2022 | Yamashita et al. | |
| 2023/0036748 A1 | 2/2023 | Miyazaki et al. | |
| 2023/0150020 A1 | 5/2023 | Tateishi et al. | |
| 2023/0166333 A1 | 6/2023 | Yorozu | |
| 2024/0018375 A1* | 1/2024 | Matsumoto | C09D 11/36 |
| 2024/0294415 A1* | 9/2024 | Gilmer | B29C 64/245 |

FOREIGN PATENT DOCUMENTS

| | | | |
|---|---|---|---|
| JP | 2022-26641 A | 2/2022 | |
| JP | 7057846 | 4/2022 | |
| JP | 7057846 B1 | * | 4/2022 |
| JP | 2022-135572 | 9/2022 | |
| WO | WO98/09798 A1 | 3/1998 | |
| WO | 2021/193339 | 9/2021 | |
| WO | 2021/206029 | 10/2021 | |

OTHER PUBLICATIONS

U.S. Appl. No. 18/149,368, filed Jan. 3, 2023, Kohji Takimoto, et al.

U.S. Appl. No. 18/165,417, filed Feb. 7, 2023, Shimpei Miyata, et al.

U.S. Appl. No. 18/169,986, filed Feb. 16, 2023, Yohichi Itoh, et al.

U.S. Appl. No. 18/177,991, filed Mar. 3, 2023, Yasuyuki Yamashita, et al.

U.S. Appl. No. 18/182,014, filed Mar. 10, 2023, Yukl Shingal.

Office Action issued in Japanese Patent Application No. 2022-113504 on Feb. 10, 2026 (with English machine translation), 3 pages.

* cited by examiner

LIQUID FABRICATION AND METHOD OF MANUFACTURING FABRICATION OBJECT

CROSS-REFERENCE TO RELATED APPLICATIONS

This patent application is based on and claims priority pursuant to 35 U.S.C. § 119 to Japanese Patent Application No. 2022-113504, filed on Jul. 14, 2022, in the Japan Patent Office, the entire disclosure of which is hereby incorporated by reference herein.

BACKGROUND

Technical Field

The present disclosure relates to a liquid fabrication and a method of manufacturing a fabrication object.

Description of the Related Art

Demand for producing fine and complicated fabrication objects made of a substance such as metal has been increasing. As a technology for meeting this need, there is a method of sintering a sintering precursor fabricated by binder jetting (BJ) using powder metallurgy, thereby manufacturing a densified object with high production efficiency.

As for the metal, various types of metals, including aluminum alloy, have been researched. As the ink for use in binder jetting suitable for aluminum alloy, solvent ink has been researched in consideration of safety and handling of aluminum powder. Regarding the binder resin in ink, resins with many hydrophobic functional groups have been researched because these are highly soluble in a solvent and easily degreased.

SUMMARY

According to embodiments of the present disclosure, a liquid fabrication is provided which contains an oligomer with a ring structure having a number average molecular weight of 3,000 or less and an organic solvent, wherein the liquid fabrication is substantially free of water and is applied to a layer of powder containing metal particles.

As another aspect of embodiments of the present disclosure, a method of manufacturing a fabrication object is provided which includes forming a layer of powder containing metal particles, applying a liquid fabrication to the layer, and sequentially repeating the forming and the applying to form a laminate, wherein the liquid fabrication contains an oligomer with a ring structure having a number average molecular weight of 3,000 or less and an organic solvent, and is substantially free of water.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1A:
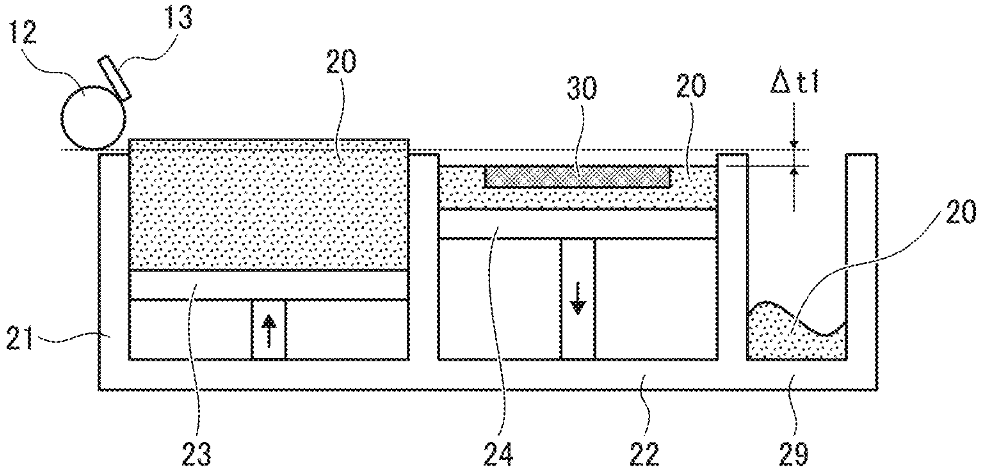
FIG. 1A is a diagram illustrating an operation of fabrication with a device for fabricating a solid freeform fabrication object.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a liquid fabrication is provided which is readily discharged and enhances strength of a green object, preventing the green object from distorting by raising the glass transition temperature of the resin in the green object even when the liquid fabrication contains a binder resin with a low glass transition temperature.

Liquid Fabrication

The liquid fabrication of the present disclosure contains an oligomer with a ring structure having a number average molecular weight of 3,000 or less and an organic solvent, wherein the liquid fabrication is substantially free of water and is applied to a layer of powder containing metal particles.

The inventors of the present invention found out a problem about typical technologies, which is that a green object solidified with a resin having a relatively low Tg, such as a polyvinyl acetate resin with excellent solubility in an organic solvent and suitable for jetting as one of the resins for binder jetting, has a risk of deforming after a long period of storage depending on the storage temperature and moisture absorption of the green object. The inventors of the present invention have thus formulated the liquid fabrication of the present disclosure.

The composition for 3D printing disclosed in Japanese Unexamined Patent Application Publication No. 2020-015848 contains an organic binder and oligomer as a material for liquid fabrication for 3D printing. However, since the composition is for fused deposition modeling (FDM), it is not suitable as an ink for binder jetting.

The liquid fabrication of the present disclosure is a liquid composition, which is used for manufacturing a fabrication object and applied to a layer of powder containing metal particles.

The liquid fabrication of the present disclosure contains an oligomer with a ring structure and an organic solvent and is substantially free of water. The liquid fabrication may contain other optional additives such as a resin and a surfactant.

A fabrication object is manufactured by executing a method including forming a layer of powder containing metal particles, applying a liquid fabrication to the layer, and sequentially repeating the forming and the applying to form a laminate.

The method preferably furthermore includes heating the laminate to form solidified matter, removing the powder adhering to the solidified matter to obtain a green object, drying the green object to remove the liquid component remaining in the green object, heating the green object to remove substances including resin derived from the liquid fabrication to obtain a degreased object, sintering the degreased object to obtain a sintered compact, and post-processing the sintered compact. The powder adhering to the solidified matter is referred to as extra powder.

The fabrication object in the present disclosure is a generic term for a solid object having a particular three dimensional form. It includes solidified matter or a structure derived from solidified matter. Specifically, the fabrication object is a concept representing substances such as solidified matter, a green object, a degreased object, and a sintered compact.

The fabrication object after heating can be also referred to as a green object, which is an unsintered compact. The fabrication object after degreasing can be referred to as a degreased object. The fabrication object after sintering can be also referred to as a sintered object.

Oligomer with Ring Structure

The oligomer with a ring structure has a ring structure and a number average molecular weight of 3,000 or less.

The number average molecular weight of the oligomer with a ring structure is 3,000 or less. It is preferably 2,500 or less and more preferably 2,000 or less considering that a liquid fabrication or ink gradually thickens and is readily degreased. The number average molecular weight of the oligomer with a ring structure is preferably 500 or greater. The number average molecular weight can be measured by any method that suits to a particular application. One way of measuring is gel permeation chromatography (GPC).

The glass transition temperature Tg of the oligomer with a ring structure can be measured by any method that suits to a particular application. It is preferably 55 degrees C. or higher, more preferably 70 degrees C. or higher, and furthermore preferably 80 degrees C. or higher. It is also preferably 110 degrees C. or lower, more preferably 105 degrees C. or lower, and furthermore preferably 100 degrees C. or lower.

The glass transition temperature can be measured with a device such as a differential scanning calorimetry (DSC2500, manufactured by TA Instruments Japan Inc.

A specific method of measuring the glass transition temperature of a target sample is as follows.

A total of 5 mg of a target sample is placed in an aluminum sample container, which is placed on a holder unit. The unit and the container are placed in an electric furnace. Then the unit and container are heated in a nitrogen atmosphere from −30 degrees C. to 200 degrees C. at a temperature rising speed of 10 degrees C./min (first temperature rising). Thereafter, the system is cooled down from 200 degrees C. to −30 degrees C. at a temperature falling speed of degrees C./min. and again heated to 200 degrees C. at a temperature rising speed of 10 degrees C./min to obtain a DSC curve using a difference scanning calorimeter.

Based on the DSC curve at the first temperature rising selected from the obtained DSC curves using the analysis program “endothermic shoulder temperature” installed in the DSC system, the glass transition temperature at the first temperature rising of the target sample is obtained. The DSC curve at the second temperature rising is selected using the analysis program “endothermic shoulder temperature” to obtain the glass transition temperature of the target sample at the second temperature rising.

The oligomer with a ring structure preferably has a softening point of 100 degrees C. or higher, more preferably 120 degrees C. or higher, and furthermore preferably 140 degrees C. or higher. The softening point is preferably 180 degrees C. or lower, more preferably 170 degrees C. or lower, and furthermore preferably 160 degrees C. or lower.

The softening point can be measured with a micro melting point apparatus (e.g., MP-S3, manufactured by Yanaco LID Co., Ltd.). The softening point is measured by observing the state of a target sample in raising the temperature of the target sample at 2 degrees C./min.

The oligomer with a ring structure is a hydrocarbon compound with a ring structure, which has advantages of having a high density and a high Tg at a ratio to the molecular weight.

The oligomer with a ring structure has a small number average molecular weight and good flowability at the softening point or higher temperatures than that. The oligomer is thus likely to wet an adherend, demonstrating good attachability. When cooled down, the oligomer tends to become cohesive. In addition, the oligomer with a ring structure has a high compatibility with the hydrophobic portion of a binder resin.

Therefore, the liquid fabrication containing the oligomer with a ring structure and a binder resin such as vinyl acetate are mutually dissolved in each other. The liquid fabrication firmly wets and attaches to the binder resin at the interface of the metal particle, forming a binder structure having a high Tg when cooled down. Therefore, even a binder resin containing a binder resin with a low glass transition temperature can raise the glass transition temperature of the resin in a green object obtained. This green object has excellent strength, reducing its deformation.

The oligomer with a ring structure can be any oligomer that suits to a particular application. It includes, but is not limited to, an aromatic oligomer such as a copolymer having an aromatic ring and a copolymer having a hydrogenated aromatic ring; a terpene-based resin such as a polyterpene resin, a hydrogenated terpene resin, an aromatic-modified terpene resin, and a terpene phenolic resin; a rosin-based resin such as a rosin-modified phenolic resin and a rosin ester resin; and an alkyl phenolic resin.

The oligomer with a ring structure preferably has an unsaturated bond in the ring structure and, more preferably, contains a thermoplastic oligomer having an unsaturated bond in the ring structure.

These can be used alone or in combination.

The thermoplastic oligomer has at least one of glass transition temperature and softening point.

Aromatic Oligomer

The aromatic oligomer includes, but is not limited to, a copolymer with an aromatic ring and a copolymer with a hydrogenated aromatic ring.

The copolymer with an aromatic ring has a repeating structural unit having an aromatic ring and other repeating structural units, which can be a block copolymer or a random copolymer.

The copolymer with a hydrogenated aromatic ring has a repeating unit having a hydrogenated aromatic ring and other repeating structural units, which can be a block copolymer or a random copolymer.

"Hydrogenated" refers to adding a hydrogen to the unsaturated bond of an aromatic ring, reducing the ring structure.

The glass transition temperature Tg of the aromatic oligomer is not particularly limited and can be suitably selected to suit to a particular application. It is preferably from to 100 degrees C.

The aromatic ring or the hydrogenated aromatic ring is not particularly limited. It can be suitably selected to suit to a particular application and includes an aromatic hydrocarbon and a condensed ring thereof. These may have a substitute. Of these, hydrocarbons having a five- or six-membered ring and condensed ring thereof are preferable. These may have a substitute.

Any repeating structural unit having a ring structural unit constituting any one of the terpene resin, the rosin resin, and the alkylphenolic resin mentioned above can be the repeating structural unit having an aromatic ring and the repeating structural unit having a hydrogenated aromatic ring.

The other repeating structural units are not particularly limited and can be suitably selected to suit to a particular application. They include, but are not limited to, allyl compounds and vinyl compounds.

One example of the copolymer having an aromatic ring is poly(styrene-co-allyl alcohol) represented by the following Chemical Formula, which has a repeating structural unit with a number of repeating structural units of x derived from styrene and a repeating structural unit with a number of repeating structural units of y derived from allyl alcohol.

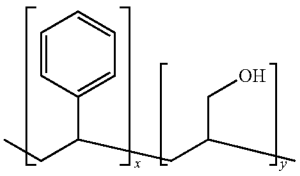

The aromatic oligomer includes synthetic aromatic oligomer and procured aromatic oligomer.

Specific examples of the procured products include, but are not limited to, TEGO Vari Plus SK (polyol resin containing polystyrene, e.g., number average molecular weight Mn of 2,500, Tg of 94 degrees C., manufactured by Evonik Industries,), poly(styrene-co-allyl alcohol) (copolymer having an aromatic ring, e.g., number average molecular weight Mn of 1,200, Tg of 92 degrees C., manufactured by Sigma-Aldrich Inc.), and poly (styrene-co-maleic anhydride) (e.g., number average molecular weight Mn of 1,900, Tg of 71 degrees C., manufactured by Sigma-Aldrich Inc.).

The Tg of the aromatic oligomer is preferably from 60 to 140 degrees C. and more preferably from 80 to 120 degrees C.

Since the aromatic oligomer has a hydrophobic aromatic backbone, it does not easily absorb moisture, which is advantageous in preventing the Tg from lowering in a high humidity environment.

Terpene Resin

Terpene resin includes, but is not limited to, polyterpene resin, hydrogenated terpene resin, aromatic modified terpene resin, and terpene phenolic resin.

Terpene as a material for the terpene resins mentioned above has a ring structure that is selected to suit to a particular application.

Specific examples include, but are not limited to, terpene represented by the following Chemical formulae, such as α-pinene, β-pinene, dipentene (limonene), α-terpinene, β-pinene, terpinolene, camphane, and Δ3-carene.

Of these, α-pinene, β-pinene, and dipentene (limonene) are preferable.

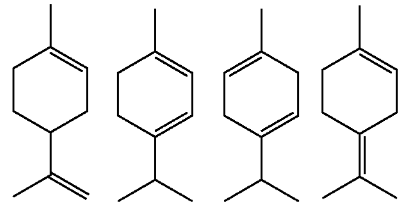

Limonene α-terpinene γ-terpinene terpinolene

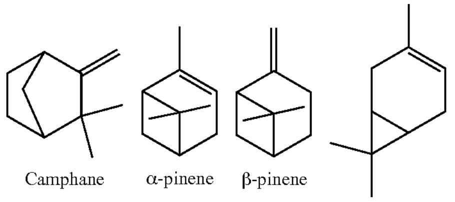

Camphane α-pinene β-pinene

Δ3-carene

If the terpene resin as a material is made of one of α-pinene, β-pinene, dipentene (limonene), examples include, but are not limited to, polyterpene resin, hydrogenated terpene resin, aromatic modified terpene resin, and terpene phenolic resin.

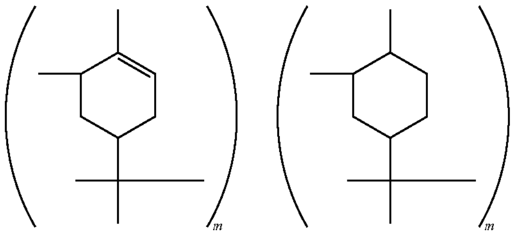

Polyterpene resin Hydrogenated terpene resin

-continued

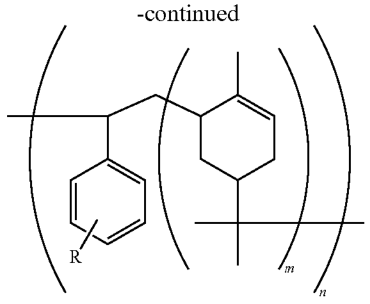

Aromatic modified terpene resin

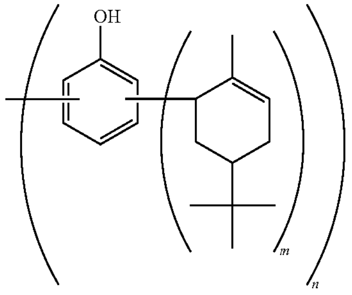

Terpene phenolic resin

The terpene resins include synthetic terpene resins and procured terpene resins.

Specific examples of the products of terpene resin include, but are not limited to, YS Polystar G150 (terpene-phenolic resins, number-average molecular weight Mn of 700, Tg of 92 degrees C., manufactured by YASUHARA CHEMICAL CO., LTD.), YS-resin PX1250 (polyterpene resins, number-average molecular weight Mn of 1,100, Tg of 69 degrees C., manufactured by YASUHARA CHEMICAL CO., LTD.), Clearon P125 (hydrogenated terpene resins, e.g., number-average molecular weight Mn of 700, Tg of 68 degrees C., manufactured by YASUHARA CHEMICAL CO., LTD.), and YS-resin TO125 (aromatic-modified terpene resins, e.g., number-average molecular weight Mn of 800, Tg of 64, manufactured by YASUHARA CHEMICAL CO., LTD.).

The Tg of the terpene resin is preferably from 55 to 105 degrees C. and more preferably from 60 to 120 degrees C.

Since the terpene resin has a hydrophobic terpene backbone, it does not easily absorb moisture, which is advantageous in preventing the Tg from lowering in a high humidity environment.

Rosin Resin

The rosin resin includes, but is not limited to, rosin-modified phenolic resin and rosin ester resin.

The rosin that forms the rosin resin is not particularly limited and can be suitably selected to suit to a particular application. Examples include, but are not limited to, abietic acid, palustric acid, and isopimaric acid.

The rosin resin includes synthetic rosin resins and procured rosin resins.

Specific examples of the products include, but are not limited to, Tamanol 135 (rosin-modified phenolic resins, e.g., Tg of 70 to 80 degrees C., manufactured by Arakawa Chemical Industries, Ltd.) and Pencel D-135 (rosin ester resins, e.g., Tg of 70 to 80 degrees C., manufactured by Arakawa Chemical Industries, Ltd.).

Alkyl Phenolic Resin

The alkyl phenolic resins include synthetic alkyl phenolic resins and procured alkyl phenolic resins. Specific examples of the products include, but are not limited to, Tamanol 200N (an alkylphenolic resin, e.g., Tg of 70 to 80 degrees C., manufactured by Arakawa Chemical Industries, Ltd.).

The proportion of the oligomer with a ring structure is not particularly limited and can be suitably selected to suit to a particular application. It is preferably from 2 to 45 percent by mass and more preferably from 3 to 7 percent by mass to the mass of a liquid fabrication. A proportion of the oligomer of 45 percent by mass or less keep low viscosity of a liquid fabrication, so that the liquid fabrication can be suitably discharged by a method including inkjetting. A proportion of the oligomer of 2 percent by mass or greater enhances bending strength of a fabrication object before sintering such as solidified matter and a green object derived from the solidified matter.

Resin

Preferably, the liquid fabrication furthermore contains a resin having a structural unit represented by the following Chemical Formula 1. This resin may be also referred to as a binder resin.

The structural unit represented by the Chemical Formula 1 mentioned above is the structural unit of polyvinyl acetate.

Chemical Formula 1

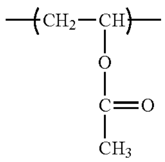

The resin having the structural unit represented by the Chemical Formula 1 is disposed in a layer of powder containing metal particles when a liquid fabrication is applied to the layer.

The resin acts as a binder for binding the metal particles in the region to which the liquid fabrication is applied via heating in accordance with the softening point of the resin, thereby forming a fabrication object before sintering such as solidified matter and a green object derived from the solidified matter. Since these fabrication objects before sintering are formed of a resin having the structural unit represented by the Chemical Formula 1 imparting flexibility, bending strength of the fabrication objects are enhanced.

The resin having the structural unit represented by the Chemical Formula 1 has excellent thermal decomposability. Therefore, the resin is appropriately removed in degreasing so that a dense sintered compact is produced through the following sintering.

When metal particles that are assumingly or preferably subjected to sintering are used as the material for forming a fabrication object, the expected results are more favorable.

Preferably, 95 percent by mass or greater of a resin having the structural unit represented by Chemical Formula 1, more preferably, 97 percent by mass or greater, is thermally decomposed in raising the temperature from 30 to 550 degrees C.

"The resin is thermally decomposed" means that the main chain of the resin is randomly decomposed or the resin is depolymerized at terminals of the molecular chain so that the resin is removed through vaporization, oxidative decomposition, or combustion. Thermal decomposition can be measured with a TG-DTA (thermogravimetry differential thermal simultaneous analyzer). Specifically, a resin is heated to 30 to 550 degrees C. at a temperature rising rate of 10 degrees C./minute in atmosphere or nitrogen atmosphere and allowed to leave for two hours after the temperature reaches 550 degrees C. Thereafter, the reduction ratio of the mass of the resin between before and after the temperature rising is calculated.

The resin having the structural unit represented by the Chemical Formula 1 has hydrophobicity due to the structural unit, which enhances solubility of the resin in an organic solvent. Such a liquid fabrication containing an organic solvent enhances solubility of the resin having the structural unit represented by the Chemical Formula 1. Resultantly, the liquid fabrication becomes less sticky, so that the liquid fabrication can be appropriately discharged by inkjetting.

Preferably, the resin having the structural unit represented by the Chemical Formula 1 is soluble in the organic solvent in a liquid fabrication and insoluble in water.

The resin having the structural unit represented by the Chemical Formula 1 preferably has a Tg of 0 degrees C. or higher, more preferably 10 degrees C. or higher, and furthermore preferably 20 degrees C. or higher. The Tg is preferably 100 degrees C. or lower, more preferably 90 degrees C. or lower, and furthermore preferably 80 degrees C. or lower.

The resin having the structural unit represented by the Chemical Formula 1 preferably has a softening point of 70 degrees C. or higher, more preferably 80 degrees C. or higher, and furthermore preferably 90 degrees C. or higher. The softening point is preferably 150 degrees C. or lower, more preferably 140 degrees C. or lower, and furthermore preferably 130 degrees C. or lower.

The number average molecular weight Mn of the resin having the structural unit represented by the Chemical Formula 1 is preferably from 5,000 to 50,000 and more preferably from 10,000 to 30,000. A number average molecular weight Mn in the range specified above strikes a balance among enhancing strength and fabrication accuracy, reducing stickiness of a liquid fabrication, and increasing the concentration of resin in the liquid fabrication.

The resin having the structural unit represented by the Chemical Formula 1 may or may not have a structural unit other than the structural unit represented by the Chemical Formula 1.

The structural unit represented by the Chemical Formulae other than the Chemical Formula 1 includes the structural unit represented by the Chemical Formula 2 or Chemical Formula 3 below.

Chemical Formula 2

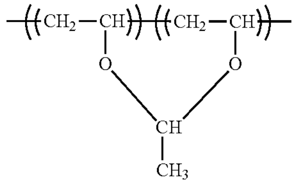

Chemical Formula 3

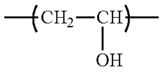

The resin having both the structural unit represented by the Chemical Formula 1 and the structural unit represented by the Chemical Formula 2 enhances bending strength of a fabrication object before sintering such as solidified matter and a green object derived from the solidified matter.

The structural unit represented by the Chemical Formula 2 has hydrophobicity like the structural unit represented by the Chemical Formula 1, which enhances solubility of the resin to an organic solvent.

From these points of views, the proportion of the sum of the structural unit represented by the Chemical Formula 1 and the structural unit represented by the Chemical Formula 2 is preferably 60 percent by mol or greater, more preferably 65 percent by mol or greater, furthermore preferably 70 percent by mol, particularly preferably 75 percent by mol, and most preferably 80 percent by mol to the sum of the structural unit represented by the Chemical Formula 1, the structural unit represented by the Chemical Formula 2, and the structural unit represented by the Chemical Formula 3.

This proportion applies to a resin free of the structural unit represented by the Chemical Formula 2 or the structural unit represented by the Chemical Formula 3. The proportion is calculated by determining the sum of the structural unit not contained in the resin as zero.

The resin having the structural unit represented by the Chemical Formula 3 in addition to the structural unit represented by the Chemical Formula 1 enhances affinity with the metal articles in the layer of powder to which a liquid fabrication is applied due to the presence of hydroxyl in the structural unit represented by the Chemical Formula 3. This enhancement ameliorates bending strength of a fabrication object before sintering such as solidified matter and a green object derived from the solidified matter and increases the density of both a fabrication object before sintering and a fabrication object after sintering.

From these points of views, the proportion of the structural unit represented by the Chemical Formula 3 is preferably 5 percent by mol or greater, more preferably 15 percent by mol or greater, and furthermore preferably 25 percent by mol to the sum of the structural unit represented by the Chemical Formula 1, the structural unit represented by the Chemical Formula 2, and the structural unit represented by the Chemical Formula 3.

However, the structural unit represented by the Chemical Formula 3 is hydrophilic. As the proportion of the structural unit represented by the Chemical Formula 3 increases, an increase in solubility of a resin having the structural unit represented by the Chemical Formula 1 decreases when a liquid fabrication contains an organic solvent. Resultantly, the liquid fabrication can avoid becoming less sticky.

From these points of views, the proportion of the structural unit represented by the Chemical Formula 3 is preferably 40 percent by mol or greater, more preferably 35 percent by mol or greater, furthermore preferably 30 percent by mol, particularly preferably 25 percent by mol, and more particularly preferably 20 percent by mol to the sum of the structural unit represented by the Chemical Formula 1, the structural unit represented by the Chemical Formula 2, and the structural unit represented by the Chemical Formula 3.

This proportion applies to a resin free of the structural unit represented by the Chemical Formula 2. The proportion is calculated by determining the sum of the structural unit not contained in the resin as zero.

Examples of the resin having the structural unit represented by the Chemical Formula 1 include, but are not limited to, a polyvinyl acetate resin, a partially saponified polyvinyl acetate resin, and a polyvinyl butyral resin.

Of these, polyvinyl acetate resins and particular partially saponified polyvinyl acetate resins are preferable to reduce viscosity of a liquid fabrication.

The partially saponified polyvinyl acetate resin has a proportion of the structural unit represented by the Chemical Formula 1 of 75 percent by mol or greater and preferably 80 percent by mol or greater to the sum of the structural unit represented by the Chemical Formula 1 and the structural unit represented by the Chemical Formula 3.

These can be used alone or in combination. Such a resin can be synthesized or procured.

Polyvinyl acetate resin has the structural unit represented by the Chemical Formula 1 and is substantially free of the structural unit represented by the Chemical Formula 2 and the structural unit represented by the Chemical Formula 3.

Polyvinyl acetate resin has the structural unit represented by the Chemical Formula 1 and is substantially free of the structural unit represented by the Chemical Formula 2 and the structural unit represented by the Chemical Formula 3.

Polyvinyl butyral resin has the structural unit represented by the Chemical Formula 1 and the structural unit represented by the Chemical Formula 2 or has the structural unit represented by the Chemical Formula 1, the structural unit represented by the Chemical Formula 2, and the structural unit represented by the Chemical Formula 3.

The partially saponified polyvinyl acetate resin is obtained by partially saponifying polyvinyl acetate resin. In the partially saponified polyvinyl acetate resin in the present disclosure, the proportion of the structural unit represented by the Chemical Formula 3 is 40 percent by mol or greater, preferably 35 percent by mol or greater, more preferably 30 percent by mol, furthermore preferably 25 percent by mol, and particularly preferably 20 percent by mol to the sum of the structural unit represented by the Chemical Formula 1 and the structural unit represented by the Chemical Formula 3. In other words, the partially saponified polyvinyl acetate resin in the present disclosure has a degree of saponification of 40 or less, preferably 35 or less, more preferably 30 or less, furthermore preferably 25 or less, and particularly preferably 20 or less.

The proportion of the resin having the structural unit represented by the Chemical Formula 1 is preferably 5.0 percent by mass or greater, more preferably 7.0 percent by mass or greater, furthermore preferably 10.0 percent by mass or greater, and particularly preferably 11.0 percent by mass or greater to the mass of a liquid fabrication. The proportion is preferably 30.0 percent by mass or less, more preferably 25.0 percent by mass or less, and furthermore preferably 20.0 percent by mass or less. A proportion of the resin of 5.0 percent by mass or greater enhances bending strength of a fabrication object before sintering such as solidified matter and a green object derived from the solidified matter. A proportion of the resin of 30.0 percent by mass or less lowers viscosity of a liquid fabrication, so that the liquid fabrication can be suitably discharged by a method including inkjetting.

A resin having a proportion of the sum of the structural unit represented by the Chemical Formula 1 and the structural unit represented by the Chemical Formula 2 of 95 percent by mol or greater to the sum of the structural unit represented by the Chemical Formula 1, the sum of the structural unit represented by the Chemical Formula 2, and the structural unit represented by the Chemical Formula 3 enhances solubility of the resin to an organic solvent, thereby lowering viscosity of a liquid fabrication, so that the proportion of such a resin to the mass of a liquid fabrication may be as high as 15.0 percent by mass or greater or 20.0 percent by mass or greater. This proportion further enhances bending strength of a fabrication object before sintering such as solidified matter and a green object derived from the solidified matter.

The proportion in percent by mol represented by each Chemical Formula in a resin can be obtained by a method such as polyvinyl alcohol testing method according to Japanese Industrial Standards (JIS)-K6276-1994 format.

Organic Solvent

The liquid fabrication mentioned above contains an organic solvent. The organic solvent is a liquid component for keeping the liquid fabrication in liquid state at room temperature.

Since the liquid fabrication is preferably a non-water-based liquid fabrication because it contains an organic solvent.

"Non-water-based liquid fabrication" contains an organic solvent as a liquid composition and the organic solvent has the largest mass among the liquid compositions in the liquid fabrication. The proportion of the organic solvent to the entire of the liquid compositions in the liquid fabrication is preferably 90.0 percent by mass or greater and more preferably 95.0 percent by mass or greater.

A resin having the structural unit represented by the Chemical Formula 1 is particularly well dissolved in a non-water-based liquid fabrication. Resultantly, the liquid fabrication becomes less sticky.

The non-water-based liquid fabrication can be reworded as a liquid fabrication substantially free of water in some occasions. Therefore, the non-water-based liquid fabrication can be used even when materials constituting metal particles are highly active metal, in other words, water-prohibitive materials such as aluminum, zinc, and magnesium. As an example, aluminum forms film of aluminum hydroxide when brought into contact with water. This film lowers sintering density of a sintered compact if a liquid fabrication contains water in a large proportion. This is solved by using this water-free liquid fabrication. In another example, aluminum produces hydrogen when brought into contact with water, which makes it difficult to handle aluminum. This liquid fabrication without water is free of this issue, too.

Specific examples of the organic solvent include, but are not limited to, n-octane, m-xylene, solvent naphtha, diisobutyl ketone, 3-heptanone, 2-octanone, acetylacetone, butyl acetate, amyl acetate, n-hexyl acetate, n-octyl acetate, ethyl butyrate, ethyl valerate, ethyl caprylate, ethyl octanoate, ethyl acetoacetate, ethyl3-ethoxypropionate, diethyl oxalate, diethyl malonate, diethyl succinate, diethyl adipate, bis-2-ethylhexyl maleate, triacetin, tributyrin, propylene glycol monomethyl ether acetate, ethylene glycol monobutyl ether acetate, dibutyl ether, 1,2-dimethoxybenzene, 1,4-dimethoxybenzene, diethylene glycol monobutyl ether, diethylene glycol dimethyl ether, triethylene glycol dimethyl ether, α-terpineol, 2-methoxy-1-methylethyl acetate, γ-butyrolactone, propylene carbonate, cyclohexanone, and butyl cellosolve. These can be used alone or in combination.

A resin having a structural unit represented by the Chemical Formula 1 can be used with any organic solvent without a particular limitation. It can be suitably selected to suit to a particular application. It is preferable to use an organic solvent having at least one structure selected from the group consisting of an alkoxy group, an ether bond, and an ester bond, more preferable, an organic solvent having an ether bond, and furthermore preferable, an alkylene glycol dialkyl ether compound. Such an organic solvent increases solubility of the resin having the structural unit represented by the Chemical Formula 1, thereby decreasing viscosity of a liquid fabrication. Resultantly, the liquid fabrication becomes less sticky, so that the liquid fabrication can be appropriately discharged by inkjetting.

"Alkylene glycol dialkyl ether compound" is represented by $R_1—(O—R_2)_m—OR_3$, where $R_1$ and $R_3$ each, independently represent linear or branched alkyl groups having 1 to 5 carbon atoms, preferably 1 or 2 carbon atoms. $R_2$ represents a linear or branched alkylene group having 2 to 5 carbon atoms, preferably 2 or 3 carbon atoms. The symbol "m" represents an integer of from 1 to 5 and is more preferably 2 or 3.

Specific examples of the alkylene glycol dialkyl ether compound include, but are not limited to, diethylene glycol dimethyl ether, triethylene glycol dimethyl ether, diethylene glycol ethyl methyl ether, and diethylene glycol butyl methyl ether.

Of these, diethylene glycol dimethyl ether and triethylene glycol dimethyl ether are preferable, and triethylene glycol dimethyl ether is more preferable.

The proportion of the organic solvent is not particularly limited and can be suitably selected to suit to a particular application. It is preferably from 60.0 to 95.0 percent by mass and more preferably from 70.0 to 95.0 percent by mass to the mass of the liquid fabrication. An organic solvent having a proportion of from 60.0 to 95.0 percent by mass increases solubility of the resin, thereby decreasing viscosity of a liquid fabrication. Resultantly, the liquid fabrication becomes less sticky, so that the liquid fabrication can be appropriately discharged by inkjetting. In addition, since a liquid fabrication is prevented from drying at a liquid fabrication applying device, the liquid fabrication can be stably discharged.

Viscosity of the organic solvent is preferably low, and concretely, preferably from 5.0 to 50.0 mPa s and more preferably from 8.0 to 30.0 mPa s at 25 degrees C. A viscosity of the organic solvent within the range specified above is likely to lower viscosity of a liquid fabrication containing the organic solvent, which stabilizes discharging from a liquid fabrication applying device such as an inkjet head. Moreover, because of this stabilized accurate discharging, bending strength of a fabrication object before sintering such as solidified matter and a green object derived from the solidified matter ameliorates, thereby enhancing dimensional accuracy of the fabrication object.

Viscosity can be measured, for example, according to the measuring method described in JIS K7117 format.

The organic solvent preferably has a high boiling point, and specifically, it is preferably 150 degrees C. or higher and more preferably 180 degrees C. or higher. This is because when a liquid fabrication containing an organic solvent having a high boiling point is discharged by inkjetting, the liquid fabrication little dries, which inhibits the resin in the liquid fabrication from precipitating at or around a nozzle, which causes nozzle clogging.

The organic solvent having a high boiling point is not particularly limited. Specific examples include, but are not limited to, γ-butyrolactone (boiling point of 204 degrees C.), propylene carbonate (boiling point of 242 degrees C.), cyclohexanone (boiling point of 155.6 degrees C.), diethylene glycol dimethyl ether (boiling point of 162 degrees C.), triethylene glycol dimethyl ether (boiling point of 216 degrees C.), and α-terpineol (boiling point of from 217 to 218 degrees C.).

When the liquid fabrication mentioned above contains the resin mentioned above, the sum of the proportion of the oligomer with a ring structure and the proportion of the resin is preferably from 2 to 45 percent by mass and more preferably from 5 to 25 percent by mass to the entire of the liquid fabrication.

A sum of the proportion of the oligomer with a ring structure and the proportion of the resin of 25 percent by mass or less keeps low viscosity of a liquid fabrication, so that the liquid fabrication can be suitably discharged by a method including inkjetting. A sum of the proportion of the oligomer with a ring structure and the proportion of the resin of 5 percent by mass or greater enhances bending strength of a fabrication object before sintering such as solidified matter and a green object derived from the solidified matter.

The liquid fabrication without a resin reduces an increase of viscosity of the liquid fabrication. Therefore, a proportion of an oligomer with a ring structure of 45 percent by mass or less suitably allows suitably discharging the liquid fabrication by a method including inkjetting.

The sum of the proportion of the mass of the oligomer with a ring structure and the proportion of the organic solvent to the mass of a liquid fabrication is preferably 90.0 percent by mass or greater, more preferably 95.0 percent by mass or greater, furthermore preferably 99.0 percent by mass or greater, and particularly preferably 99.5 percent by mass or greater. The liquid fabrication may be substantially free of components other than the organic solvent and the oligomer with a ring structure.

This liquid fabrication substantially free of components other than the organic solvent and the oligomer with a ring structure means that the component other than the organic solvent and the oligomer with a ring structure is not actively selected as the material for preparing the liquid fabrication or the component other than the organic solvent and the oligomer with a ring structure is not detectable by a known and common technical method.

If the liquid fabrication mentioned above contains the resin mentioned above, the sum is replaced with the sum of the proportion of the organic solvent, the proportion of the oligomer with a ring structure, and the proportion of the resin.

A proportion of the sum to the mass of the liquid fabrication of 90.0 percent by mass or greater increases the proportion of the oligomer with a ring structure contained in the liquid fabrication, thereby enhancing bending strength of a fabrication object before sintering such as solidified matter and a green object derived from the solidified matter. In addition, since the proportion of the components other than the organic solvent and the oligomer with a ring structure, such as materials including metal fine particles insoluble in the liquid fabrication, decreases or is substantially zero, viscosity of the liquid fabrication lowers, thereby enhancing discharging stability and storage stability of the liquid fabrication.

Additive

The liquid fabrication is not particularly limited and can be suitably selected to suit to a particular application. Examples include, but are not limited to, a surfactant, a drying preventive agent, a viscosity modifier, a permeating agent, a defoaming agent, a pH regulator, a preservative, a mildew-proofing agent, a colorant, a preserving agent, and a stabilizer. These known additives may be appropriately used.

Other Components

Water

The liquid fabrication is substantially free of water.

In the present disclosure, "substantially free of water" means the proportion of water to the mass of a liquid fabrication is 10.0 percent by mass or less, preferably 5.0 percent by mass or less, more preferably 3.0 percent by mass or less, furthermore preferably 1.0 percent by mass or less, and particularly preferably 0 percent by mass. A liquid fabrication substantially free of water enhances solubility of the resin mentioned above, which furthermore lowers viscosity of the liquid fabrication. Moreover, hydrogel containing a massive quantity of water is prevented from forming around the resin, which inhibits an increase in the viscosity of the liquid fabrication. Resultantly, the liquid fabrication can be appropriately discharged by inkjetting.

"Liquid fabrication substantially free of water" means that water is not positively selected as the material for preparing a liquid fabrication or water is not detectable by a known and common technical method.

In addition, a liquid fabrication substantially free of water can be used even when materials constituting metal particles are highly active metal, in other words, water-prohibitive materials such as zinc, magnesium, or alloys thereof. For example, aluminum brought into contact with water forms film of aluminium hydroxide, which lowers the sintering density of a sintered compact if a liquid fabrication contains water in a large amount. A waterless liquid fabrication is free of this issue. In another example, aluminum brought into contact with water produces hydrogen, which is difficult to handle. A waterless liquid fabrication is free of this issue, too.

Method of Manufacturing Liquid Fabrication

The method of manufacturing the liquid fabrication mentioned above is not particularly limited and can be suitably selected to suit to a particular application. One way of manufacturing is to mix and stir the materials specified above.

The organic solvent preferably has low viscosity. Specifically, it is preferably from to 50 mPa·s, more preferably from 5 to 40 mPa·s, and furthermore preferably from 5 to 30 mPa·s at 25 degrees C. A viscosity of the liquid fabrication within the range specified above stabilizes discharging the liquid fabrication from a liquid fabrication applying device such as an inkjet head and, because of this accurate discharging, bending strength of a fabrication object prior to sintering such as solidified matter and a green object derived from the solidified matter ameliorates, thereby enhancing the dimensional accuracy of the fabrication object.

Viscosity can be measured, for example, according to the measuring method described in JIS K7117 format.

The surface tension of the liquid fabrication is preferably 40 mN/m or less and more preferably from 10 to 30 mN/m at 25 degrees C. A viscosity of the liquid fabrication of 40 mN/m stabilizes discharging the liquid fabrication from a liquid fabrication applying device such as an inkjet head and, because of this accurate discharging, bending strength of a fabrication object prior to sintering such as solidified matter and a green object derived from the solidified matter ameliorates, thereby enhancing the dimensional accuracy of the fabrication object.

Surface tension can be measured with DY-300, manufactured by Kyowa Interface Science Co., LTD., for example.

Powder Containing Metal Particle

The powder mentioned above contains metal particles and other optional components.

The metal particle is treated as powder, a collective form containing multiple metal particles. To a layer of the powder, a liquid fabrication is applied to manufacture a fabrication object.

Metal Particle

The metal particle is used to manufacture a fabrication object and contains metal as a constituent material. The constituent materials of the metal particle are not particularly limited as long as it contains metal. They may contain a material other than metal but preferably contains metal as the main material. Metal as the main material means the proportion of the metal in a metal particle to the entire mass of the metal particle is 50.0 percent by mass or greater, preferably 60.0 percent by mass or greater, more preferably 70.0 percent by mass or greater, furthermore preferably 80.0 percent by mass or greater, and particularly preferably 90.0 percent by mass or greater.

Specific examples of the constituent material of the metal particle include, but are not limited to, magnesium (Mg), aluminum (Al), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), lead (Pd), silver (Ag), indium (In), tin (Sn), tantalum (Ta), tungsten (W), neodymium (Nd), and alloys of these metals.

Of these, stainless (SUS) steel, iron 8Fe), Copper (Cu), silver (Ag), titanium (Ti), aluminum (Al), zinc (Zn), magnesium (Mg), and alloys thereof are preferable.

Specific examples of the aluminum alloys include, but are not limited to, $AlSi_{10}Mg$, $AlSi_{12}$, $AlSi_7Mg_{0.6}$, $AlSi_3Mg$, $AlSi_9Cu_3$, Scalmalloy, $ADC_{12}$, and $AlSi_3$.

These can be used alone or in combination.

The metal particle can be manufactured according to a known method. Metal particles can be manufactured by a method such as a pulverization method of pulverizing a solid by processes such as compression, impact, and friction, an atomizing method of spraying a molten metal to obtain quickly-quenched powder, a precipitation method of precipitating a component dissolved in a liquid, and a gas-phase reaction method of gasification for crystallization. Of these, the atomizing method is preferable to obtain a spherical form with a less fluctuation regarding the particle size. Examples of the atomizing method are a water atomizing method, a gas atomizing method, a centrifugal atomizing method, and plasma atomizing method. Any of these can be suitably used.

The metal particle can be procured. Specific examples of the marketed products include, but are not limited to, $AlSi_2Mg$ (SiioMgBB, manufactured by Toyo Aluminium K.K.), pure Al (A1070-30BB, manufactured by Toyo Aluminium K.K.), pure Ti (manufactured by OSAKA Titanium technologies Co., Ltd.), SUS316L (PSS316L, manufactured by SANYO SPECIAL STEEL Co., Ltd.), $SiO_2$ (Excelleka SE-15K, manufactured by Tokuyama Corporation), $AlO_2$ (TAIMICRON TM-5D, manufactured by Taimei Chemicals Co., Ltd.), and $ZrO_2$ (TZ-B53, manufactured by TOSOH CORPORATION).

The volume average particle diameter of the metal particle is not particularly limited and can be suitably selected to suit to a particular application. It is preferably from 2 to 100 μm and more preferably from 8 to 50 μm. A volume average particle diameter of the metal particles of 2 μm or greater inhibits the aggregation of the metal particles, a decrease in the efficiency of producing a fabrication object, and the degradation of handling property of the metal particles. A volume average particle diameter of the metal particles of 100 μm or less inhibits a decrease in contact points between the metal particles and an increase in voids, which reduces a decrease in strength of a fabrication object.

The particle size distribution of the metal particle is not particularly limited and can be suitably selected to a particular application. It is preferable to have a sharp particle size distribution.

The volume average particle diameter and the particle size distribution of the metal particles can be measured by a known particle size measuring device such as a particle size distribution measuring device (Microtrac MT3000II series, manufactured by MicrotracBEL Corp.).

A typical method of manufacturing a fabrication object is known which includes applying liquid to a metal particles containing a resin for coating a metal substrate in order for the metal particles to act as a binder in the coating resin. In the present disclosure, the liquid fabrication contains a resin that demonstrates binding function. Therefore, the surface of the metal particles may or may not be covered with resin. If metal particles not covered with resin are used, it is possible to avoid producing unintentional solidified matter at powder regions where liquid is not applied, in other words, non-fabrication region, by binding metal particles with the coating resin via heating. "Not covered with resin" means that, for example, the ratio of the surface area of the resin to the surface area of the metal particle, i.e., surface coverage, is less than 15 percent or less, including 0 percent.

One way of obtaining the surface coverage is to measure the surface area of a metal particle covered with resin and the entire surface area of the metal particle in a two-dimensional photo of the metal particle and calculate the ratio of the surface area to the entire surface area. What part is covered with the resin is determined by utilizing a method such as element mapping by energy dispersive X-ray spectroscopy such as scanning electron microscope-energy dispersive X-ray spectroscopy (SEM-EDS).

Other Components

Examples of the other optional components include, but are not limited to, a filler, a leveling agent, a sintering helping agent, and a resin particle polymer.

Filler is effectively used to adhere to the surface of a metal particle and fill the gap between metal particles. Filler is used to enhance flowability of powder and increase the contact points between inorganic particles, thereby reducing the gap therebetween and enhancing strength and dimensional accuracy of a fabrication object.

Leveling agents are suitable for adjusting wettability of the surface of the layer of powder. Leveling agents can be used to enhance permeation of a liquid fabrication to the layer of powder, thereby increasing strength of a fabrication object.

Sintering helping agents are suitable for increasing the efficiency of sintering to sinter a solid freeform fabrication object. Sintering helping agents can enhance strength of a fabrication object and lower the sintering temperature, thereby completing sintering in a short time.

Resin polymer particles are effective to adhere to the surface of metal particles and also referred to as organic external additives. The average particle diameter of resin polymer particle is not particularly limited and can be suitably selected to suit to a particular application. It is preferably from 0.1 to 10 1.tm and more preferably from 0.1 to 1 μm.

The repose angle of the powder is preferably 60 degrees or lower, more preferably 50 degrees or lower, and furthermore preferably 40 degrees or lower. A repose angle of 60 degrees or lower can stably and efficiently dispose the powder on a desired site on a substrate.

The repose angle can be measured with a powder property measuring device such as powder tester PT-N type, manufactured by Hosokawa Micron Corporation).

Kit for Manufacturing Fabrication Object

A kit for manufacturing a fabrication object contains the liquid fabrication of the present disclosure, powder containing the metal particle, and other optional components such as liquid remover. The liquid fabrication may be present separately from the powder containing metal particles in the kit. The kit is not limited to a case in which a liquid fabrication storage unit containing the liquid fabrication is integrated with a powder storage unit containing the powder. The fabrication kit includes a case where the liquid fabrication and the powder are assumed or substantially guided to be used in combination even when the liquid fabrication and the powder are stored in independent storage units.

Method of Manufacturing Fabrication Object

The method of manufacturing a fabrication object of the present disclosure includes forming a layer of powder containing metal particles, applying a liquid fabrication to the layer of powder, sequentially repeating the forming and the applying to form a laminate. and other optional operations.

The method may furthermore optionally include heating the laminate to form solidified matter, removing the extra powder adhering to the solidified matter to obtain a green object, drying the green object to remove the liquid component remaining in the green object, heating the green object to remove the substances including the resin derived from the liquid fabrication to obtain a degreased object, sintering the degreased object to obtain a sintered compact, and post-processing the sintered compact. The powder adhering to the solidified matter is referred to as extra powder.

Forming Layer of Powder

The method of forming a layer of powder executes forming a layer of powder containing metal particles.

The layer of powder is formed on a support (fabrication stage).

The method of forming a thin layer of powder by disposing the powder on a support is not particularly limited and can be suitably selected to suit to a particular application. Specific examples include, but are not limited to, a method using a known counter rotation mechanism (counter roller) for use in a selective laser sintering method disclosed in Japanese Patent No. 3607300, a method of extending powder using a member such as a brush, a roller, and a blade, a method of pressing the surface of powder using a pressure member to extend the powder, and a method of using a known additive manufacturing device.

A layer of powder is formed by the following method using a powder layer forming device such as a counter rotation mechanism (counter roller), a brush, a blade, or a pressing member.

Powdered material is placed on a support disposed that can elevate up and down slidably along the inside wall of the outer frame (also referred to as "form", "hollow cylinder" and "tubular structure") with a device including a counter rotation mechanism (counter roller), a brush, a roller, a blade, or a pressing member. At this point, when the support is movable up and down in the outer frame, the support is positioned slightly lower than the upper aperture of the outer frame. Specifically, while placing the support below the upper aperture by the thickness equivalent to a layer of powder, the powder is placed on the support. The thin layer of powder is thus disposed on the support.

The thickness of the layer of powder is not particularly limited and can be selected to suit to a particular application. For example, the average thickness of the layer is preferably from 30 to 500 μm and more preferably from 60 to 300 μm.

An average thickness of 30 μm or greater enhances the strength of solidified matter formed by applying a liquid fabrication to powder and prevents shapeless of a fabrication object which may occur in the following operation such as sintering. An average thickness of 500 μm or less enhances the dimensional accuracy of a fabrication object derived from solidified matter formed by applying a liquid fabrication to powder.

The average thickness is not particularly limited and can be measured according to a known method.

The powder supplied by the device for forming a layer of powder may be accommodated in a powder storage device.

The powder storage device is a member such as a container accommodating powder. It includes, but is not limited to, a storage tank, bag, cartridge, and tank.

Applying Liquid Fabrication

In the application of a liquid fabrication, a liquid fabrication is applied to the layer of powder.

The liquid fabrication contains an oligomer with a ring structure and a number average molecular weight of 3,000 or less and an organic solvent and is substantially free of water. The descriptions on the liquid fabrication of the present disclosure are applied to the liquid fabrication mentioned above.

Discharging the liquid fabrication to the layer of powder is preferable as the method of applying the liquid fabrication to a layer of powder. The method of discharging a liquid fabrication is not particularly limited and can be suitably selected to suit to a particular application. Specific examples of the methods of discharging include, but are not limited to, a spraying method, an inkjet printing method, or a dispenser method. Of these, the dispenser method has an excellent liquid quantitative property but the application area is small. The spraying method is capable of simply forming a fine discharging material at a wide application area, i.e., demonstrating excellent applicability, but the quantitative property thereof is poor so that discharged matter scatters due to the spray stream. The inkjet method is thus preferable. The inkjet printing has a good quantitative property in comparison with the spraying method and moreover a wider application area in comparison with the dispenser method. Accordingly, the inkjet printing is preferable in order to accurately and efficiently form a complex fabrication object.

The device for discharging a liquid fabrication by inkjetting is an inkjet head including a nozzle for discharging the liquid fabrication. As the inkjet head, an inkjet head in a known inkjet printer can be suitably used. An example of the inkjet head in an inkjet printer is an industrial inkjet RICOH MH/GH SERIES, manufactured by Ricoh Company, Ltd. An example of the inkjet printer is SG7100, manufactured by Ricoh Company Ltd.

The liquid fabrication supplied to the device for applying a liquid fabrication may be accommodated in a liquid fabrication storage unit. The liquid fabrication storage unit is a member such as a container accommodating a liquid fabrication and includes, but is not limited to, a storage tank, bag, cartridge, and tank.

Laminating (Repeating Forming and Applying)

During the laminating, the forming and the applying are repeated to form a laminate with a laminating device.

A "laminate" means a structure in which layers of powder having regions where a liquid fabrication is applied are laminated. This structure may or may not include a solid object including a particular solid form inside.

The laminating includes placing powder in a thin layer manner and applying a liquid fabrication to the thin layer to form a region where the liquid fabrication is applied in the layer of the powder. The laminating furthermore includes placing the powder on the thin layer having a region to which the liquid fabrication is applied in the same manner as described above (forming a layer of powder) and applying the liquid fabrication to the thin layer (applying a liquid fabrication) to form the regions where the liquid fabrication is applied in the layer of powder newly laminated. The uppermost region in the laminated thin layer of powder to which the liquid fabrication is applied is continuous to the region present under the uppermost region, to which the liquid fabrication is applied. Resultantly, a region having a thickness corresponding to the two layers of powder to which the liquid fabrication is applied is obtained.

Heating

The method of manufacturing a fabrication object preferably includes heating a laminate to form solidified matter.

"Solidified" means a state of maintaining a particular form. "Solidified matter" means a structure having a solid object maintaining a particular solid form. "Solidified matter" is not yet through removing extra powder, a substance not constituting a solid object, which adheres to the solidified matter.

The heating temperature in the heating is preferably higher than the softening point of the oligomer with a ring structure or of the resin and the oligomer with a ring structure if the liquid fabrication contains the resin. If the heating temperature is not lower than the softening point, the extra solvent remaining compatible with the oligomer is accelerated to evaporate, so that a fabrication object prior to sintering such as solidified matter and a green object derived from the solidified can be suitably formed. On the other hand, if part of the solvent remains after drying, a green object obtained may be weak.

The heating device is not particularly limited. It includes a device such as a drier and an environmental experiment chamber.

Removing Extra Powder

The method of manufacturing a fabrication object preferably includes removing extra powder, which adheres to solidified matter, to obtain a green object.

"Green object" is a solid object maintaining a particular solid form, obtained through removing extra powder, which does not constitute solidified matter. Preferably, the green object is substantially free of extra powder. The fabrication object after heating can be referred to as a green object, which is an unsintered compact. The fabrication object after degreasing can be referred to as a degreased object. The fabrication object after sintering can be also referred to as a sintered object.

Extra powder is removed from solidified matter preferably by air blowing or dipping the solidified matter in a liquid remover and more preferably by both air blowing and dipping.

The solidified matter after heating is buried in extra powder to which a liquid fabrication is not applied. Extra powder adheres to the surface and the inside of this buried solidified matter when it is taken out of extra powder. Removing such extra powder from the solidified matter is not easy. If solidified matter has a complicated surface shape or an inside having shape like a flow path, this removal becomes more difficult. A fabrication object fabricated by typical binder jetting is not strong if the object is not sintered. Therefore, the fabrication object may collapse under a high pressure of air blowing with a blower.

To the contrary, solidified matter formed by using the liquid fabrication of the present disclosure containing the resin mentioned above has bending strength enough to bear the pressure of air blowing.

The solidified matter preferably has a bending strength of 4.0 MPa or greater, more preferably 5.0 MPa or greater, and more preferably 6.0 Mpa or greater at the three-point bending test.

Liquid Remover

The liquid remover contains an organic solvent and other optional components. The organic solvent contained in a liquid fabrication is also referred to as the first organic solvent and the organic solvent contained in a liquid remover is also referred to as the second organic solvent to distinguish one from the other.

Examples of the organic solvent include, but are not limited to, ketone, halogen, alcohol, ester, ether, hydrocarbon, glycol, glycol ether, glycol ester, pyrrolidone, amide, amine, and carbonate ester.

Specific examples of ketone include, but are not limited to, acetone, methyl ethyl ketone, diethyl ketone, methyl propyl ketone, methyl isobutyl ketone, methyl amyl ketone, cyclohexanone, isophorone, acetophenone, and diacetone alcohol.

Specific examples of halogen include, but are not limited to, methylenechloride, trichloroethylene, perchloroethylene, HCFC141-b, HCFC-225, 1-bromopropane, chloroform, and o-dichlorobenzene.

Specific examples of alcohol include, but are not limited to, methanol, ethanol, butanol, isobutanol, isopropyl alcohol, normal propyl alcohol, tertiary butanol, secondary butanol, 1,3-butanediol, 1,4-butanediol, 2-ethylhexanol, and benzyl alcohol.

Specific examples of ester include, but are not limited to, methyl acetate, ethyl acetate, butyl acetate, isobutyl acetate, sec-butyl acetate, methoxybutyl acetate, 3-methoxybutyl acetate, 3-methoxy-3-methylbutyl acetate, ethyl-3-ethoxypropionate, amyl acetate, n-propyl acetate, isopropyl acetate, methyl lactate, ethyl lactate, butyl lactate, propylene glycol monomethyl ether acetate, propylene glycol monomethyl ether propionate, ethyl 3-ethoxypropionate, and dibasic acid ester (DBE).

Specific examples of ether include, but are not limited to, dimethyl ether, ethyl methyl ether, diethyl ether, ethylene oxide, tetrahydrofuran, furan, benzofuran, diisopropyl ether, methyl cellosolve, ethyl cellosolve, butyl cellosolve, 1,4-dioxane, methyl tert-butyl ether (MTBE), ethylene glycol dimethyl ether, diethylene glycol dimethyl ether, ethylene glycol diethyl ether, diethylene glycol diethyl ether, triethylene glycol dimethyl ether, diethylene glycol dibutyl ether, dipropylene glycol dimethyl ether, and dipropylene glycol monomethyl ether.

Specific examples of hydrocarbon include, but are not limited to, benzene, toluene, xylene, solvent naphtha, n-hexane, isohexane, cyclohexane, ethylcyclohexane, methylcyclohexane, cyclohexene, cycloheptane, cyclopentane, heptanes, pentamethylbenzene, pentanes, methylcyclopentane, n-Heptane, isooctane, n-decane, n-pentane, isopentane, mineral spirits, dimethylsulfoxide, and linear alkylbenzenes.

Specific examples of glycol include, but are not limited to, ethylene glycol, diethylene glycol, triethylene glycol, propylene glycol, and dimethoxytetraethylene glycol.

Specific examples of glycol ester include, but are not limited to, ethylene glycol monoethyl ether acetate and diethylene glycol monobutyl ether acetate.

Specific examples of glycol ether include, but are not limited to, methyl carbitol, ethyl carbitol, butyl carbitol, and methyl triglycol.

Specific examples of pyrrolidone include, but are not limited to, 2-pyrrolidone, N-ethyl-2-pyrrolidone, and N-methyl-2-pyrrolidone.

Specific examples of amide include, but are not limited to, dimethylformamide, dimethylacetamide, and formamide.

Specific examples of amine include, but are not limited to, tetramethylethylenediamine, N, N-diisopropylethylamine, ethylenediamine, triethylamine, diethylamine, aniline, pyrrolidine, piperidine, morpholine, pyrrole, pyridine, pyridazine, oxazole, thiazole, and 1,3-dimethyl-2-imidazolidinone.

Specific examples of carbonic acid ester include, but are not limited to, diethyl carbonate, dimethyl carbonate, propylene carbonate, and ethyl methyl carbonate.

As the other components, various additives such as a surfactant, a defoaming agent, a preservatives and fungicides, a chelate agent, a corrosion inhibitor, and a pH regulator can be optionally added.

Drying

The method of manufacturing a fabrication object preferably includes drying the green object to remove the liquid components such as a liquid remover remaining in the green object.

Organic matter may be also removed in drying in addition to the liquid components such as a liquid remover in the green object. The drying device includes, but is not limited to, known driers and environmental experiment chambers.

Degreasing

The method of manufacturing a fabrication object preferably includes heating a green object to remove the oligomer with a ring structure derived from the liquid fabrication (oligomer with a ring structure and the resin if the resin is contained) to obtain a degreased object.

The "degreased object" means a solid object obtained by degreasing the organic component such as the oligomer with a ring structure (oligomer with a ring structure and the resin if the resin is contained) from a green object.

In the degreasing, the organic components including the oligomer with a ring structure (oligomer with a ring structure and the resin if the resin is contained) are decomposed and removed by heating a green object for a particular time (for example, 1 to 10 hours) at temperatures between the thermal decomposition temperature of the organic components and the melting point or solidus temperature (for example, about 570 degrees C. for $AlSi_{10}Mg$ particles) of the materials (metal) constituting the metal particles using a degreasing device. The degreasing device includes a known sintering furnace and electric furnace.

Specifically, the oligomer with a ring structure (oligomer with a ring structure and the resin if the resin is contained) is decomposed at temperatures higher than its thermal decomposition temperature and temperatures lower than the melting point or solidus temperature of the metal particle. The heating temperature can be set at multiple temperatures depending on the components of the oligomer with a ring structure and the resin to be used. Instead of heating, an alternative method of degreasing is to immerse a green object in a solvent to extract the oligomer with a ring structure (oligomer with a ring structure and the resin if the resin is contained).

Sintering

The method of manufacturing a fabrication object preferably includes sintering a degreased object with heat to obtain a sintered compact. "The sintered compact" means a solid object formed by integrating metallic materials constituting metal particles. The sintered compact is fabricated by sintering a degreased object.

In the sintering, the metallic materials constituting metal particles are integrated by heating a degreased object for a particular time (for example, 1 to 10 hours) at temperatures between the solidus temperature (for example, about 570 degrees C. for $AlSi_{10}Mg$ particles) of the metallic materials and the liquidus temperature of the metallic materials (for example, about 600 degrees C. for $AlSi_{10}Mg$ particles) using a sintering device. Fabrication objects can be sintered with a known sintering furnace or the same device as the degreasing device mentioned above. The degreasing and the sintering may be conducted continuously.

Specifically, a degreased green object was heated at 1 to 200 degrees C. per hour to temperatures between the liquidus temperature and the solidus temperature (the temperature rising speed can be changed in the middle of course). This temperature is kept for 1 to 10 hours. Preferably, at the highest reaching temperature, the liquid phase of the metal materials is produced in an amount of from 10 to 50 percent. These operations can be conducted in vacuum, Ar, $H_2$, or $N_2$ atmosphere. The furnace is cooled down to obtain a molded product after heating and maintaining.

Post-Processing Processing Unit

The method of manufacturing a fabrication object preferably includes post-processing a sintered compact.

The post-processing is not particularly limited and can be suitably selected to suit to a particular application. Examples include, but are not limited to, a surface protection treatment and a painting treatment.

Embodiments on Method of Manufacturing Fabrication Object

Embodiments (flow of fabrication) in the method of manufacturing a fabrication object of the present disclosure is described with reference to FIGS. 1A to 1E. FIGS. 1A to 1E are schematic diagrams illustrating operations of a device for manufacturing a fabrication object.

The description starts from the state in which a first layer (a liquid fabrication applied layer 30) of a powder 20 is formed on a fabrication stage 24 of a fabrication tank 22. When the next layer of powder is formed on the first layer of liquid fabrication applied layer 30, the supply stage 23 of the supply tank 21 is ascended and the fabrication stage 24 of the fabrication tank 22 is descended as illustrated in FIG. 1A. The descending distance of the fabrication stage 24 is determined in such a manner that the distance (lamination pitch) between the upper surface of the layer of powder at the fabrication tank 22 and the bottom part (bottom tangent portion) of a flattening roller 12 is Δt1. The length Δt1 is not particularly limited. It is preferably about several tens μm to about 100 μm.

In the present disclosure, the flattening roller 12 is disposed to make a gap to the upper surfaces of the supply tank 21 and the fabrication tank 22. Therefore, when the powder 20 is conveyed and supplied to the fabrication tank 22 for flattening, the upper surface of the layer of the powder 20 situated at a position higher than the upper surfaces of the supply tank 21 and the fabrication tank 22. For this reason, the flattening roller 12 is absolutely prevented from contacting the upper surfaces of the supply tank 21 and the fabrication tank 22, thereby reducing damage to the flattening roller 12. If the flattening roller 12 is damaged on the surface, it produces streaks on the surface of a powder layer 31 (FIG. 1D) supplied to the fabrication tank 22 so that the surface is likely to become rough.

Figure 1B:
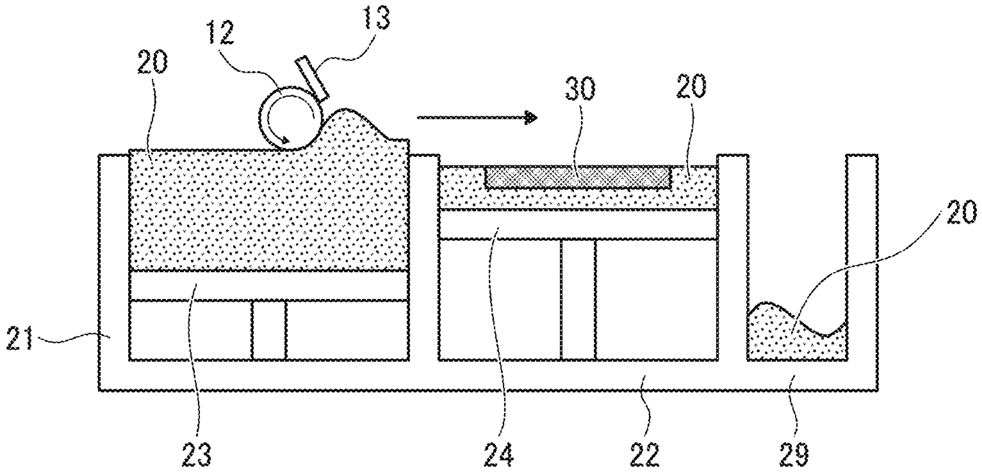
FIG. 1B is a diagram illustrating another operation of fabrication with a device for fabricating a solid freeform fabrication object.
Figure 1C:
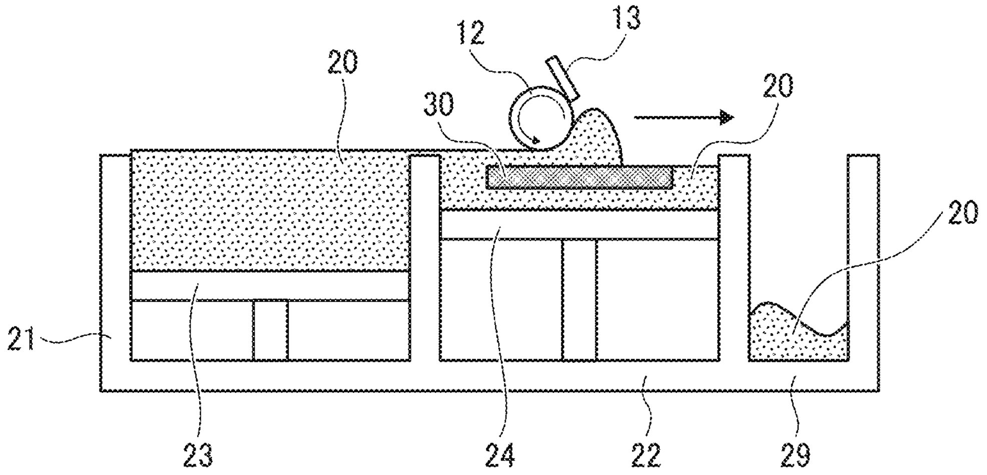
FIG. 1C is a diagram illustrating another operation of fabrication with a device for fabricating a solid freeform fabrication object.
Figure 1D:
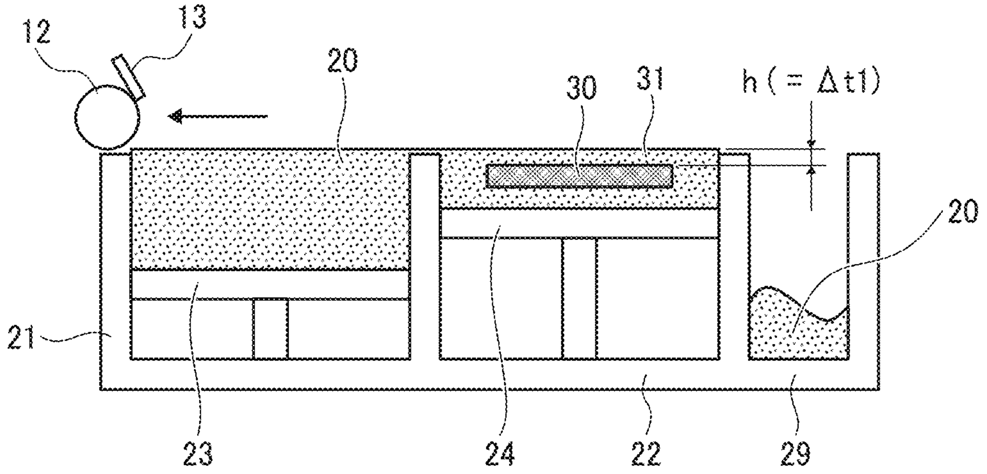
FIG. 1D is a diagram illustrating another operation of fabrication with a device for fabricating a solid freeform fabrication object.

Thereafter, as illustrated in FIG. 1B, the powder 20 positioned above the upper surface of the supply tank 21 is moved to the side of the fabrication tank 22 by the flattening roller 12 rotating along the direction indicated by the arrow. Resultantly, the powder 20 is moved and supplied to the fabrication tank 22 (powder supply). Moreover, as illustrated in FIG. 1C, the flattening roller 12 is moved in parallel to the stage surface of the fabrication stage 24 of the fabrication tank 22 to form the layer 31 of powder having a predetermined thickness of Δt1 on the fabrication tank 22 of the fabrication stage 24 (layer flattening). At this point, the powder 20 which is not used to form the powder layer 31 falls into a residual powder receiving tank 29. After forming the powder layer 31, as illustrated in FIG. 1D, the flattening roller 12 is moved to the side of the supply tank 21 and back to the initial (original) position.

The flattening roller 12 moves while keeping the distance between the flattening roller 12 and the upper surfaces of both the fabrication tank 22 and the supply tank 21. As the flattening roller 12 moves with this constant distance, the powder layer 31 having a uniform thickness h (corresponding to the lamination pitch Δt1) can be formed on the fabrication tank 22 or the already-formed liquid fabrication applied layer 30 while the flattening roller 12 conveys the powder 20 onto the fabrication tank 22. The thickness h of the powder layer 31 and the lamination pitch Δt1 are described without a distinction in some occasions. Unless otherwise specified, both have the same thickness and the same meaning. The thickness h of the powder layer 31 can be obtained by actual measuring. In such a measurement, the thickness h is preferably determined as the average of the results on multiple positions.

Figure 1E:
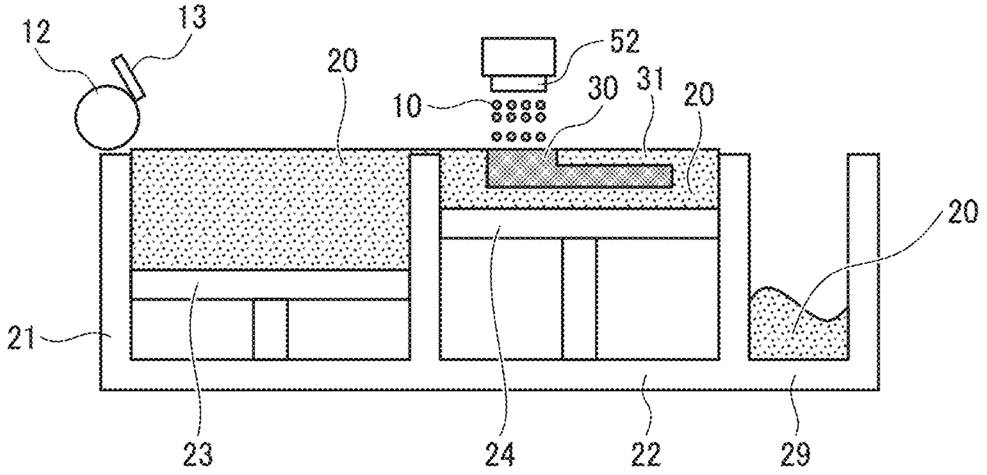
FIG. 1E is a diagram illustrating another operation of fabrication with a device for fabricating a solid freeform fabrication object.

Thereafter, as illustrated in FIG. 1E, liquid droplets 10 of a liquid fabrication are discharged from a head 52 of the liquid discharging unit to form the liquid fabrication applied layer 30 having a target shape on the next powder layer 31. Next, another liquid fabrication applied layer 30 is laminated by repeating forming a powder layer and applying liquid fabrication described above. This newly formed liquid fabrication applied layer 30 is integrated with the liquid fabrication applied layer 30 under the newly formed liquid fabrication applied layer 30 at this point. Thereafter, the layer forming and the liquid fabrication applying are repeated to complete a laminate.

The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present disclosure is described in detail with reference to Examples but are not limited thereto.

Example 1

Preparation of Liquid Fabrication

The materials shown in Table 1 were prescribed and stirred with a magnetic stirrer for four hours while being heated at 70 degrees C. After the stirring, the mixture was cooled down to the room temperature while being stirred to prepare the liquid fabrication of Example 1.

The proportion of each of each material in Tables 1 and 2 is represented in parts by mass. All of the resins, the oligomers with a ring structure, the oligomer without a ring structure are in a form of powder, pellet, or block. The proportion represents the entire mass of each material.

Powder Containing Metal Particle

As the powder containing metal particles, powdered $AlSi_{10}$ ($Si_{10}$Mg-30BB, volume average particle diameter of 35 surface of metal particle not covered with resin, manufactured by Toyo Aluminium K.K.) was used.

Fabrication of Solid Freeform Fabrication Object (Green Object)

Powder was used with the liquid fabrication of Example 1 to manufacture a solid freeform fabrication object (green object) of a laminate of solidified matter, by printing a size with a length of 40 mm and a width of 10 mm in the following manner.

1. Powder was moved from a supply tank to a fabrication tank with a known device for manufacturing a solid freeform fabrication object as illustrated in FIGS. 1A to 1E to form a thin layer of powder with an average thickness of 100 μm on the fabrication stage.
2. To the surface of the thin layer of the powder, a liquid fabrication was applied (discharged) from the nozzles of a known inkjet discharging head to dispose the oligomer with a ring structure (the oligomer with a ring structure and the resin of the resin was contained in the liquid fabrication) around the metal particles.

The liquid fabrication was discharged in a region with a length of 40 mm x a width of mm.

3. Next, the operations 1 and 2 mentioned above were repeated to sequentially laminate thin layers of the solidified powder until the total average thickness reached a particular value, i.e., 3 mm, in order to fabricate a laminate of solidified powder. Thereafter, the laminate was heated with a drier at least 140 degrees C. to obtain a solid freeform fabrication object in which solidified matter was laminated.
4. The dried solid freeform fabrication object was subjected to air blowing to obtain a green object from which extra powder was removed.

Evaluation

Viscosity of Liquid Fabrication

Viscosity of the liquid fabrication was measured with a cone and plate rotary viscometer (VISCOMETER TVE-22L, manufactured by TOKI SANGYO CO., LTD.). The measuring vessel was kept at 25 degrees C. using a high temperature circulation tank. The rotor used was a cone rotor (1° 34'×R24). The results are shown in Table 1.

Measuring of Tg

A total of 1 g of the liquid fabrication was measured in an aluminum cup followed by heating on a hot stirrer at 150 degrees C. for six hours to obtain a dried solid resin. A part of the resin was scraped off from the aluminum cup and measured with a profile with heating and cooling four times in total with a differential scanning calorimeter (DSC 2500, manufactured by TA Instruments Japan Inc.) Specifically, the resin was heated from −30 to 200 degrees for the first time, cooled down to −30 degrees C. for the second time, heated to 200 degrees C. for the third time, and cooled down to −30 degrees C. for the fourth time. The data for the third time was adopted as Tg and evaluated according to the following evaluation criteria. The results are shown in Table 1.

Evaluation Criteria

A: Tg is 60 degrees C. or higher

B: Tg is from 50 to lower than 60 degrees C.

C: Tg is from 45 to lower than 50 degrees C.

D: Tg is lower than 45 degrees C.

Bending Strength of Green Object

The green object manufactured in the 4 mentioned above was measured about bending strength and evaluated according to the following evaluation criteria. Bending strength was measured with a universal tester (autograph, type AG-1, manufactured by Shimadzu Corporation) using a 1 kN load cell and three point bending jig. The distance between the supporting points was 24 mm and the stress at the load point displaced at a speed of 1 mm/min was plotted against the amount of distortion. The stress at the breaking point was determined as the maximum stress. The bending stress was evaluated according to the following evaluation criteria The results are shown in Table 1.

Evaluation Criteria

A: Bending strength of 6.0 MPa or greater

B: Bending strength of from 5.0 to lower than 6.0 MPa

C: Bending strength of from 4.0 to lower than 5.0 MPa

D: Bending strength of lower than 4.0 MPa

Deflection of Fabrication Object (Green Object) at High Temperature and High

Moisture Environment

A green object of a length of 100 mm, a thickness of 3 mm, and a width of 10 mm was stored in a small environment tester (SH-222, manufactured by ESPEC Corp.) while keeping posture supported at the position 5 mm inside from both ends to confirm whether the green object deflected at the center portion. Whether there was a gap at the center portion was confirmed by placing a straight stainless scale on the green object to measure the deflection amount.

The small environment tester was operated while the tester inside was kept under an environment of a temperature of 40 degrees C. and a humidity of 60 percent. The green object was taken after an arbitrary period such as one day, two weeks, four weeks, and five weeks to confirm defelection.

Evaluation Criteria

A: No distortion or deflection after four weeks or longer

B: No distortion or deflection before two weeks and until four weeks

C: Distorted within two weeks

Relative Density of Sintered Compact

The green object obtained was heated temperatures between the decomposition temperature of the oligomer with a ring structure and the resin and the solidus temperature (about 570 degrees C.) of the metal particle of $AlSi_{10}Mg$ to obtain a degreased object. Thereafter, the degreased object was heated at temperatures between the solidus temperature (about 570 degrees C.) and the liquidus temperature (about 600 degrees C.) for one to ten hours to obtain a sintered compact.

The ratio of the density of the sintered compact to the density of the metal material forming the sintered compact was calculated and evaluated according to the following evaluation criteria.

Evaluation Criteria

A: Ratio of density of sintered compact was 97 percent or greater

B: Ratio of density of sintered compact was from 93 to lower than 97 percent

C: Ratio of density of sintered compact was lower than 93 percent

Examples 2 to 6 and Comparative Examples 1 and 2 The liquid fabrications and the solid freeform fabrication objects of Examples 2 to 6 and Comparative Examples 1 and 2 were obtained and evaluated in the same manner as in Example 1 except that the prescription was changed to the prescriptions shown in Tables 1 and 2. The results are shown in Tables 1 and 2.

TABLE 1

| | Material | Example 1 | 2 | 3 | 4 | 5 | 6 |
|---|---|---|---|---|---|---|---|
| Organic solvent | Triglyme(triethylene glycol dimethylether) | 75.9 | 85.9 | 85.9 | 85.9 | 86.9 | 84.9 |
| | α-terpineol | 10.0 | | | | | |
| Resin | JNR-10LL (polyviny acetate, saponification value of 10 mol percent) | 11.0 | 10.0 | 10.0 | 10.0 | 6.0 | |
| Oligomer with a ring structure | TEGO Vari Plus SK | 3.0 | | | | 7.0 | 15.0 |
| | YS Polystar G150 (terpene phenolic resin) | | 4.0 | | | | |
| | YS Resin PX1250 (polyterpene resin) | | | 4.0 | | | |
| | Poly(styrene-co-allyl alcohol) | | | | 4.0 | | |
| Oligomer without a ring structure | Poly(ethylene glycol)methyl ether (Mn 2000) | | | | | | |
| | Poly(ethylene glycol)methyl ether (Mn 5000) | | | | | | |
| Surfactant/additive | Surflon S-693 | 0.1 | 0.1 | 0.1 | 0.1 | 0.1 | 0.1 |
| Total (percent by mass) | | 100.0 | 100.0 | 100.0 | 100.0 | 100.0 | 100.0 |
| Liquid fabrication viscosity (mPa · s) 25 degrees C. | | 19 | 18 | 18 | 18 | 13 | 9 |
| Tg (degrees C.) of dried liquid fabrication | Evaluation | B | B | C | B | A | A |
| | Found value | 52 | 55 | 48 | 57 | 64 | 93 |
| Bending strength (Mpa) of fabrication object (green object) | Evaluation | A | B | B | B | A | C |
| | Found value | 6.8 | 5.7 | 5.0 | 5.4 | 6.2 | 4.3 |
| Relative density (percent) of sintered compact | Evaluation | A | A | A | A | A | A |
| | Found value | 97 | 98 | 98 | 98 | 98 | 99 |
| Deflection of fabrication object (green object) at high temperature and high moisture environment | | A | A | B | A | A | A |

TABLE 2

| | Material | Comparative Example 1 | 2 |
|---|---|---|---|
| Organic solvent | Triglyme(triethylene glycol dimethylether) | 85.9 | 85.9 |
| | α-terpineol | | |
| Resin | JMR-10LL (polyviny acetate, saponification value of 10 mol percent) | 10.0 | 10.0 |
| Oligomer with a ring structure | TEGO Vari Plus SK | | |
| | YS Polystar G150 (terpene phenolic resin) | | |
| | YS Resin PX1250 (polyterpene resin) | | |
| | Poly(styrene-co-allyl alcohol) | | |
| Oligomer without a ring structure | Poly(ethylene glycol)methyl ether (Mn 2000) | 4.0 | |
| | Poly(ethylene glycol)methyl ether (Mn 5000) | | 4.0 |
| Surfactant/additive | Surflon S-693 | 0.1 | 0.1 |
| Total (percent by mass) | | 100.0 | 100.0 |

TABLE 2-continued

| | Material | Comparative Example 1 | 2 |
|---|---|---|---|
| Liquid fabrication viscosity (mPa · s) 25 degrees C. | | 18 | 19 |
| Tg (degrees C.) of dried liquid fabrication | Evaluation | D | D |
| | Found value | 25 | 25 |
| Bending strength (Mpa) of fabrication object (green object) | Evaluation | D | D |
| | Found value | 3.2 | 2.9 |
| Relative density (percent) of sintered compact | Evaluation | A | A |
| | Found value | 98 | 98 |
| Deflection of fabrication object (green object) at high temperature and high moisture environment | | C | C |

The materials, the products, and the sellers and manufacturers of Examples 1 to 6 and Comparative Examples 1 and 2 are as follows.

TABLE 3

| Material/product | Number average molecular weight Mn | Tg (degrees C.) | Seller/manufacturer |
|---|---|---|---|
| Triglyme(triethylene glycol dimethylether) | — | — | Manufactured by TOHO Chemical Industry Co., Ltd. |
| α-terpineol | — | — | Yasuhara Chemical Co., Ltd. |
| JMR-10LL (polyviny acetate, saponification value of 10 mol percent) | 19000 to 21000 | 40 | JAPAN VAM & POVAL CO.,LTD. |
| TEGO Vari Plus SK | 2500 | 94 | Evonik Industries AG |
| YS Polystar G150 (terpene phenol) | 700 | 92 | Yasuhara Chemical Co., Ltd. |
| YS Resin PX1250 (terpene resin) | 1100 | 69 | Yasuhara Chemical Co., Ltd. |
| Polystyrene-co-allylalcohol | 2000 | 92 | Sigma-Aldrich Japan K.K. |
| Poly(ethylene glycol)methyl ether | 2000 | 10 | Sigma-Aldrich Japan K.K. |
| Poly(ethylene glycol)methyl ether | 5000 | 14 | Sigma-Aldrich Japan K.K. |
| Surflon S-693 | — | — | AGC SEIMI CHEMICAL CO., LTD. |

As seen in the results of Examples 1 to 6, Tg of the dried liquid fabrication rose because of a minor amount of the oligomer with a ring structure contained. The green object obtained was found to maintain excellent strength.

In addition, due to the oligomer with a small molecular weight, the liquid fabrication was found not to become sticky, which is suitable for inkjetting.

On the other hand, a small amount of the oligomer without a ring structure added in Comparative Examples 1 and 2 did not raise Tg of the dried liquid fabrication, which lowered Tg, to the contrary.

In comparison with Examples 2 and 3, the terpene phenolic resin containing an unsaturated bond in the ring structure was found to have a larger impact on the effect of raising Tg of the dried liquid fabrication than the terpene resin without an unsaturated bond in the ring structure.

Aspects of the present disclosure are, for example, as follows.

1. A liquid fabrication contains an oligomer with a ring structure having a number average molecular weight of 3,000 or less and an organic solvent, wherein the liquid fabrication is substantially free of water and is applied to a layer of powder containing metal particles.
2. The liquid fabrication according to the 1 mentioned above, wherein the oligomer contains at least one member selected from the group consisting of a copolymer with an aromatic ring, a copolymer with a hydrogenated aromatic ring, a polyterpene resin, a hydrogenated terpene resin, an aromatic-modified terpene resin, a terpene phenolic resin, a rosin-modified phenolic resin, a rosin ester resin, and an alkyl phenolic resin.
3. The liquid fabrication according to the 1 or 2 mentioned above, wherein the oligomer contains a thermoplastic oligomer having an unsaturated bond in the ring structure.
4. The liquid fabrication according to any one of the 1 to 3 mentioned above, further contains a resin having a structural unit represented by the following Chemical Formula 1, Chemical Formula 1

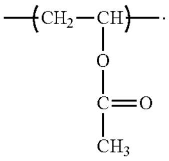

5. The liquid fabrication according to any one of the 1 to 4 mentioned above, wherein the metal particles contain at least one member selected from the group consisting of aluminum, zinc, and magnesium.
6. The fabrication kit according to any one of the 1 or 5 mentioned above, wherein the metal particles are not covered with a resin.
7. The liquid fabrication according to any one of the 1 to 6 mentioned above, wherein the liquid fabrication has a viscosity of from 5 to 50 mPa·s at 25 degrees C.
8. A method of manufacturing a fabrication object includes forming a layer of powder containing metal particles, applying a liquid fabrication to the layer, and sequentially repeating the forming and the applying to form a laminate, wherein the liquid fabrication contains an oligomer with a ring structure having a number average molecular weight of 3,000 or less and an organic solvent, and is substantially free of water.
9. The method according to the 8 mentioned above, wherein the applying includes discharging the liquid fabrication to the layer by inkjetting.
10. The method of manufacturing a fabrication object according to the 8 or 9 mentioned above further includes heating the laminate to form solidified matter and removing extra powder adhering to the solidified matter to obtain a green object.
11. The method according to the 10 mentioned above further contains heating the green object to form a degreased object from which the oligomer is removed and heating the degreased object to form a sintered compact.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A method of manufacturing a fabrication object comprising:

forming a layer of powder containing metal particles;

applying a liquid fabrication to the layer; and sequentially repeating the forming and the applying to form a laminate, wherein the liquid fabrication contains an oligomer with a ring structure having a number average molecular weight of 3,000 or less and an organic solvent, and is substantially free of water, and wherein the liquid fabrication further comprises a resin having a structural unit represented by the following Chemical Formula 1, Chemical Formula 1

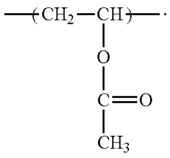

2. The method according to claim 1, wherein the applying includes discharging the liquid fabrication to the layer by inkjetting.

3. The method according to claim 1, further comprising:
heating the laminate to form solidified matter; and
removing extra powder adhering to the solidified matter to obtain a green object.

4. The method according to claim 3 further comprising:
heating the green object to form a degreased object from which the oligomer is removed; and
heating the degreased object to form a sintered compact.

5. The method according to claim 1,
wherein the oligomer comprises at least one member selected from the group consisting of a copolymer with an aromatic ring, a copolymer with a hydrogenated aromatic ring, a polyterpene resin, a hydrogenated terpene resin, an aromatic-modified terpene resin, a terpene phenolic resin, a rosin-modified phenolic resin, a rosin ester resin, and an alkyl phenolic resin.

6. The method according to claim 1, wherein the oligomer comprises a thermoplastic oligomer having an unsaturated bond in the ring structure.

7. The method according to claim 1, wherein the metal particles comprise at least one member selected from the group consisting of aluminum, zinc, and magnesium.

8. The method according to claim 1, wherein a surface of the metal particles is not covered with resin.

9. The method according to claim 1, wherein the liquid fabrication has a viscosity of from 5 to 50 mPa's at 25 degrees C.

10. The method according to claim 1, wherein the oligomer with a ring structure has a number average molecular weight of 500 or greater and 2,000 or less.

11. The method according to claim 1, wherein the resin having a structural unit represented by the Chemical Formula 1 comprises a polyvinyl acetate resin.

12. The method according to claim 1, wherein the resin having a structural unit represented by the Chemical Formula 1 comprises a partially saponified polyvinyl acetate resin.

13. The method according to claim 1, wherein the oligomer comprises at least one member selected from the group consisting of a copolymer with an aromatic ring and a copolymer with a hydrogenated aromatic ring.

14. The method according to claim 1, wherein the oligomer comprises at least one member selected from the group consisting of a polyterpene resin, a hydrogenated terpene resin, an aromatic-modified terpene resin, and a terpene phenolic resin.

15. The method according to claim 1, wherein the oligomer comprises at least one member selected from the group consisting of a rosin-modified phenolic resin, a rosin ester resin, and an alkyl phenolic resin.

* * * * *